(12) United States Patent
Zaghloul et al.

(10) Patent No.: US 10,271,244 B2
(45) Date of Patent: Apr. 23, 2019

(54) SYSTEM AND METHOD FOR MANAGING TRAFFIC DETECTION

(71) Applicant: SANDVINE INCORPORATED ULC, Kitchener (CA)

(72) Inventors: Said Zaghloul, Waterloo (CA); Yuval Lifshitz, Kfar Haoranim (IL)

(73) Assignee: Sandvine Corporation, Vancouver (CA)

( * ) Notice: Subject to any disclaimer, the term of this patent is extended or adjusted under 35 U.S.C. 154(b) by 70 days.

(21) Appl. No.: 14/977,984

(22) Filed: Dec. 22, 2015

(65) Prior Publication Data
US 2017/0181037 A1    Jun. 22, 2017

(51) Int. Cl.
*H04W 4/00* (2018.01)
*H04W 28/10* (2009.01)
*H04L 12/851* (2013.01)
*H04L 12/26* (2006.01)
*H04M 15/00* (2006.01)
(Continued)

(52) U.S. Cl.
CPC ......... *H04W 28/10* (2013.01); *H04L 41/0893* (2013.01); *H04L 43/026* (2013.01); *H04L 47/2441* (2013.01); *H04M 15/66* (2013.01); *H04W 4/24* (2013.01); *H04L 43/12* (2013.01)

(58) Field of Classification Search
None
See application file for complete search history.

(56) References Cited

U.S. PATENT DOCUMENTS

| | | | |
|---|---|---|---|
| 9,961,212 B2 * | 5/2018 | Li | H04M 15/66 |
| 2012/0239816 A1 * | 9/2012 | Carnero Ros | H04M 15/66 709/227 |

(Continued)

FOREIGN PATENT DOCUMENTS

WO    2012077073    6/2012

OTHER PUBLICATIONS

European Patent Office, Extended European Search Report on EP Patent App. No. 16206257.4, dated May 3, 2017.
(Continued)

*Primary Examiner* — Bob A Phunkulh
(74) *Attorney, Agent, or Firm* — Gowling WLG (Canada) LLP; Neil W. Henderson

(57) ABSTRACT

A method for managing traffic detection including: receiving predetermined traffic monitoring conditions; processing at least one packet to determine packet properties; determining an application identifier to associate with the traffic flow based on the packet properties; determining at least one policy to apply to the traffic flow based on the traffic monitoring conditions, packet properties and the application identifier; and communicating the at least one policy to be applied to the traffic flow. A system including: a traffic detection function (TDF) configured to receive predetermined traffic monitoring conditions, wherein the TDF includes: a processor configured to process at least one packet to determine packet properties; and a control engine configured to: determine an application identifier to associated with the flow; determine at least one policy to apply to the flow based on the traffic monitoring conditions, the packet properties and application identifier; and communicate the at least one policy.

18 Claims, 16 Drawing Sheets

(51) Int. Cl.
    *H04W 4/24* (2018.01)
    *H04L 12/24* (2006.01)

(56) References Cited

U.S. PATENT DOCUMENTS

| | | | | |
|---|---|---|---|---|
| 2013/0077491 | A1* | 3/2013 | Cherian | H04W 28/10 370/235 |
| 2014/0098671 | A1* | 4/2014 | Raleigh | H04M 15/80 370/235 |
| 2014/0189137 | A1* | 7/2014 | Castro Castro | H04M 15/66 709/228 |
| 2014/0342690 | A1 | 11/2014 | Tanouchev et al. | |
| 2015/0011182 | A1* | 1/2015 | Goldner | H04M 15/66 455/406 |
| 2015/0109987 | A1* | 4/2015 | Wang | H04W 12/08 370/312 |
| 2015/0350093 | A1* | 12/2015 | Munoz De La Torre Alonso | H04L 47/2425 370/259 |
| 2016/0073282 | A1* | 3/2016 | Speicher | H04W 28/0284 370/230 |
| 2016/0127318 | A1* | 5/2016 | Hua | H04L 63/0263 726/1 |
| 2016/0142935 | A1* | 5/2016 | Oettl | H04W 28/0252 370/235 |
| 2016/0157240 | A1* | 6/2016 | Dribinski | H04L 43/08 370/329 |
| 2016/0262057 | A1* | 9/2016 | Speicher | H04W 28/24 |
| 2017/0201629 | A1* | 7/2017 | Li | H04M 15/66 |

OTHER PUBLICATIONS

3GPP Standard, "3rd Generation Partnership Project; Technical Specification Group Services and System Aspects; Telecommunication Management; Charging Management; Packet Switched (PS) Domain Charging (Release 13)", 3GPP TS 32.251, 3rd Generation Partnership Project (3GPP), vol. SA WG5, No. V13.3.0, France, Dec. 18, 2015, pp. 1-179 (XP051047084).

International Telecommunication Union, "Gateway Control Protocol: ITU-T H.248 Support for Deep Packet Inspection", ITU-T Draft, Study Period 2013-2016, Geneva, Switzerland, Nov. 13, 2015, pp. 1-54 (XP044140359).

* cited by examiner

SYSTEM AND METHOD FOR MANAGING TRAFFIC DETECTION

FIELD

The present disclosure relates generally to managing computer network traffic. More particularly, the present disclosure relates to a system and method for managing traffic detection.

BACKGROUND

The 3rd Generation Partnership Project (3GPP) brings together various telecommunication standard development organizations. The 3GPP covers telecommunication network technology and is intended to provide a complete system specification.

The 3GPP has introduced a functional element called a Traffic Detection Function (TDF) as a new entity in the packet core network architecture referred to as System Architecture Evolution (SAE). The TDF is intended to enable application detection and reporting from the data plane to a Policy and Charging Rules Function (PCRF). Generally, the TDF is dependent on the PCRF to enable the application detection and reporting functionality on the TDF.

As defined by the 3GPP specifications, the TDF resides on the data plane. In addition to traffic detection and reporting to the PCRF, the TDF performs traffic management and steering to Value Added Services (VAS) platforms in the network. Application Based Charging (ABC) was recently added in the 3GPP specification to allow the TDF to participate and enable the creation of application based plans by integrating with the charging components namely the Online Charging System (OCS) and the Offline Charging System (OFCS).

It is, therefore, desirable to provide an improved method and system for managing traffic detection.

The above information is presented as background information only to assist with an understanding of the present disclosure. No determination has been made, and no assertion is made, as to whether any of the above might be applicable as prior art with regard to the present disclosure.

SUMMARY

In a first aspect, a method for managing traffic detection on a network is provided, the method including: receiving, at a Traffic Detection Function (TDF), predetermined traffic monitoring conditions; processing, at a processor, at least one packet from a traffic flow to determine packet properties; determining, at a control engine, an application identifier to associate with the packet flow based on the packet properties; determining, at a control engine, at least one policy to apply to the traffic flow based on the traffic monitoring conditions, packet properties and the application identifier; and communicating the at least one policy to be applied to the traffic flow.

In a particular case, application identifier is a multi-dimensional application identifier.

In another particular case, the multi-dimensional application identifier indicates whether the traffic flow is associated with a tethered device.

In still another particular case, communicating the at least one policy includes communicating a request to create a new charging session for the traffic flow.

In yet another particular case, processing of the at least one packet to determine packet properties includes determining a subscriber location associated with the traffic flow.

In still yet another particular case, determining a subscriber location includes determining a change in subscriber location, and on a change in subscriber location creating a new charging session for the subscriber.

In a particular case, the method further includes reporting the application identifier to a network operator.

In another particular case, the method further includes receiving a subscriber location associated with the packet from a network probe and determining at least one policy based on the subscriber location.

In still yet another particular case, the at least one packet is received from a Radio Access Network (RAN).

In a further aspect there is provided, a system for managing traffic detection on a network, the system including: a Traffic Detection Function (TDF) configured to receive predetermined traffic monitoring conditions, wherein the TDF includes: a processor configured to process at least one packet from a traffic flow to determine packet properties; and a control engine configured to: determine an application identifier to associated with the traffic flow based on the packet properties; determine at least one policy to apply to the traffic flow based on the traffic monitoring conditions, the packet properties and application identifier; and communicate the at least one policy to apply to the traffic flow.

In a particular case, the application identifier is a multi-dimensional application identifier.

In another particular case, the multi-dimensional application identifier indicates whether the traffic flow is associated with a tethered device.

In still another particular case, the control engine is further configured to communicate a request to create a new charging session for the traffic flow.

In yet another particular case, the processor is further configured to determine a subscriber location associated with the traffic flow.

In still yet another particular case, if the processor determines a change in the subscriber location, the control engine is configured to communicate at least one policy to create a new charging session for the subscriber.

In another particular case, the control engine is configured to report the application identifier to a network operator.

In still another particular case, the TDF is further configured to receive a subscriber location from a network probe and the control engine is configured to associate the subscriber location with the packet and determine at least one policy based on the subscriber location.

In yet another particular case, the at least one packet is received from a Radio Access Network (RAN).

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system for managing traffic detection. Embodiments of the system and method are intended to reducing Policy and Charging Control (PCC) signaling flows and reduce the dependencies in conventional Traffic Detection Function (TDF). Wth reduced dependency, the embodiments disclosed herein are also intended to provide a resilient charging and revenue assurance using the TDF. Embodiments of the method and system described herein are further intended to provide for multi-dimensional application detection.

Embodiments of the system and method detailed herein are intended to provide more accurate and up-to-date data to the network operator. In particular, the TDF may receive subscriber information or traffic data from, for example, a network probe, a network device associated with a Radio Access Network (RAN), or the like, or may pull subscriber information or traffic data from inspection of the packets within the traffic flow. The TDF may be notified or receive information on any changes to the subscriber information or traffic data, for example on a subscriber change of location, a change in application, or the like. The TDF may provide for multi-dimensional application detection in order to provide a more accurate view of subscriber generated traffic, including tethered traffic.

Generally, it is intended that the embodiments of the method and system described herein provide for a subscriber aware TDF. By reducing the dependencies of the TDF, it is intended that the TDF can continue to monitor and charge for data flows even during a failure of the Policy and Charging Rules Function (PCRF).

It is further intended that the deployed TDF continues to be compatible with 3GPP specifications. The embodiments of the system and method disclosed herein are intended to provide for the TDF to include carrier grade functionalities for charging, configurability, deployment flexibility, and charging and revenue assurance.

Figure 1:
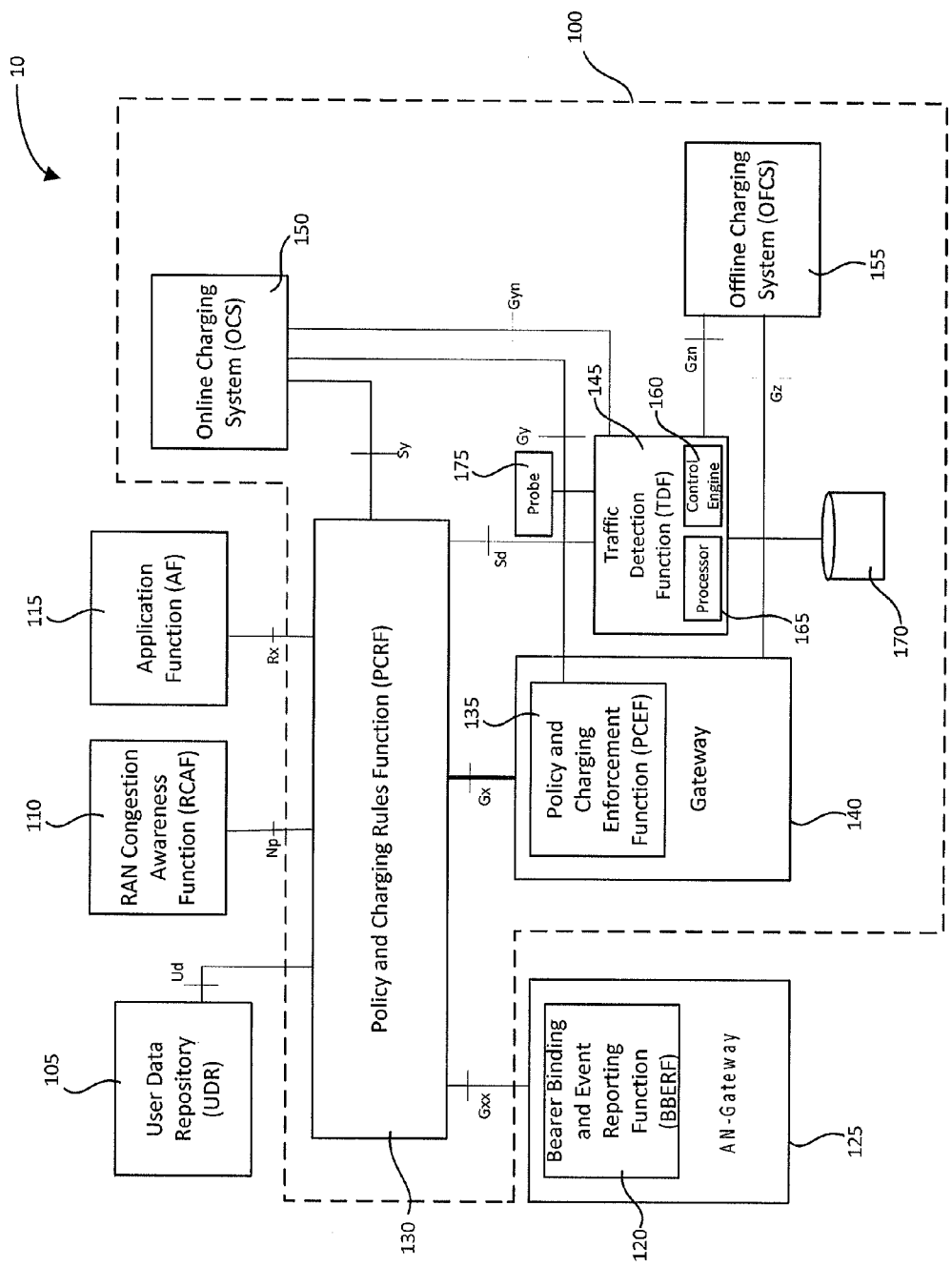
FIG. 1 is a diagram of a system for managing traffic detection.

FIG. 1 illustrates a core network 10, for example a network operator's managed network, which includes a system 100 for managing traffic detection. The core network offers numerous services to various customers who are interconnected by an access network. The core network 10 includes: User data repository (UDR) 105, a RAN Congestion Awareness Function (RCAF) 110, an Application Function (AF) 115, and a Bearer Binding and Event Reporting Function (BBERF) 120, within an Access Network Gateway (AN-Gateway) 125. The system 100 includes a PCRF 130, a Policy and Charging Enforcement Function (PCEF) 135, a Packet Data Network (PDN) Gateway (PGVV)140, a TDF 145, an Online Charging System (OCS) 150 and an Offline Charging System (OFCS) 155. The interfaces between the components of the core network 10 are labeled in FIG. 1 according to the 3GPP specification. It will be understood that as the 3GPP standards evolve, further interfaces may be added.

The system 100 may further include a probe 175 configured to monitor traffic within the core network 10 and to send data associated with the traffic to the TDF 145. Although a single probe is shown, in some cases the system 100 may include a plurality of network probes 175 configured to monitor the traffic flow.

The TDF 145 includes a control engine 160 and a processor 165 and may be operatively connected to a database 170, which may include a protocol library. The control engine 160 serves multiple functions. The control engine 160 interacts with various external entities such as, for example, the PCRF 130, OCS 150, OFCS 155 over the Sd, Gyn, and Gzn interfaces to exchange Diameter messages for policy control and charging. The control engine 160 may also interact with the processor 165 to pass enforcement actions as a result of communications with the PCRF 130, the OCS 150, local policies or the like. Further, the control engine 160 may also receive internal events and notifications and decide whether to forward the events or information related to the events to external servers such as the OCS 150, OFCS 155, the PCRF 130, or the like, as described herein.

The processor 165 is configured to inspect all data plane traffic in real-time, and apply policy or enforcement to the traffic, for example, steering traffic, shaping traffic, marking or blocking traffic, count traffic, or simply pass traffic. As a result of traffic inspection and analysis, the processor 165 determines patent properties, for example, contextual information about the traffic passing through the TDF 145. For instance, the processor 165 may determine whether the traffic belongs to specific application categories (for example, a video category (for example, YouTube™)), whether the traffic is served by an Android™ device, whether the device is tethered behind an iPhone™ or the like. By combining information from the control plane whether through the PCRF 130 or coming from the probe 175, the TDF 145 is intended to improve the contextual information about the subscribers' application traffic for instance YouTube™ traffic coming from an Android™ device in a cell site in the downtown area.

The database 170 may include at least one protocol library. Protocol libraries are periodically updated to ensure that the TDF 145 maintains fresh and up-to-date signatures of protocols and applications. As described herein, the capability to extend the definition of an application beyond a mere signature to a full context of location, device, application category, whether the device is tethered or not, etc. along with the application signature is intended to allow the network operator to create richer and more complex policies and plans.

Figure 2A:
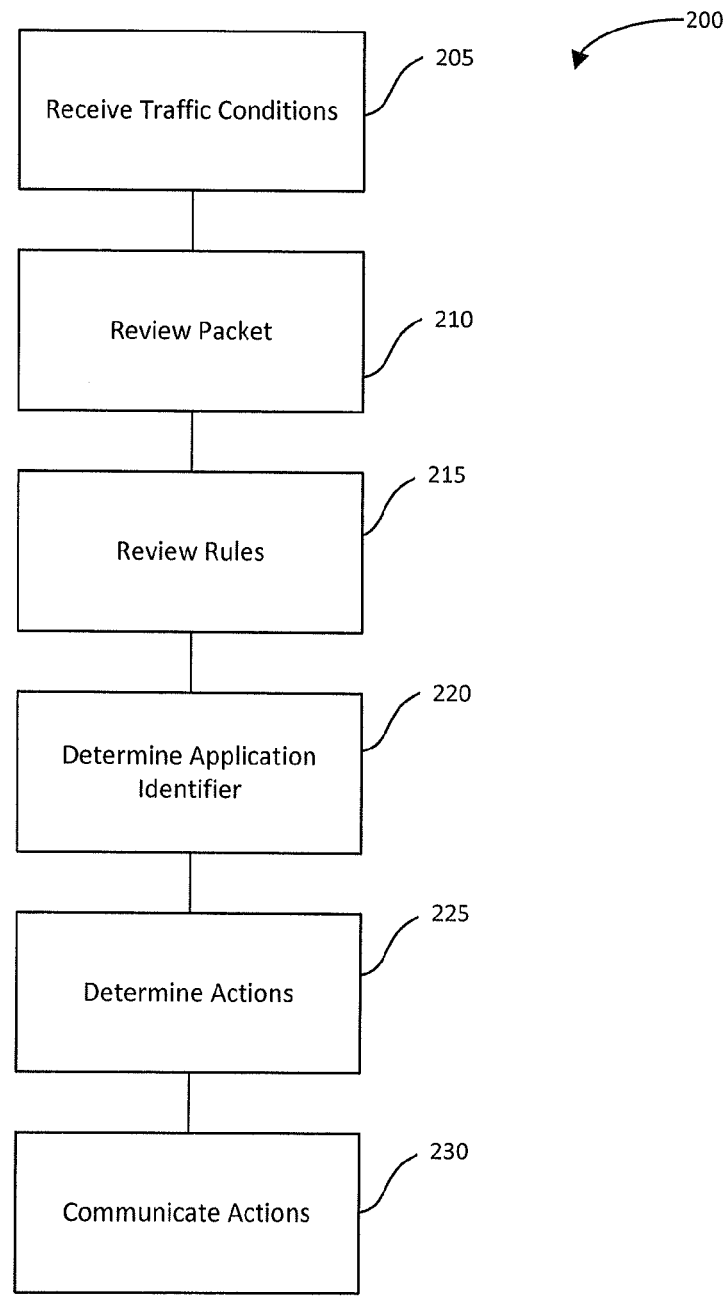
FIGS. 2A and 2B are flow charts illustrating a method for managing traffic detection.

FIG. 2A illustrates a method 200 for managing traffic detection. At 205, the TDF 145 receives predetermined traffic monitoring conditions. In some cases, these conditions may have been previously determined by the network operator. In other cases, the TDF 145 may retrieve conditions from, for example, the database 170, the PCRF 130, the OCS 150, the OFCS 155 or the like.

At 210, the TDF 145 reviews the packets in a subscriber's traffic flow (sometimes referred to as packet flow) to determine whether any of the packets include properties that meet the traffic monitoring conditions. By reviewing the packets, the TDF matches the traffic flow to, for example an Open System Interconnection (OSI) Application layer (layer 7) protocol signature. The TDF 145 further processes the packets within the traffic flow to determine other properties relevant to the packet flow. For example, whether the traffic flow is coming from a tethering device, for instance, based on analyzing Time-to-Live fields in the IP headers and TCP sequence numbers in the transport layer (layer 4). The TDF 145 might also determine that the traffic flow is part of a multi-flow video. Based on location information coming from, for example, the PCRF 130, the network probe 175, embedded within data packets themselves, or the like, the TDF 145 associates the packet and traffic flow with a location (for example, cell site, a tracking area, or the like). The TDF 145 may also associate the traffic flow with signaling learned from the OCS 150 (over, for example, the Gyn interface) that this traffic should be treated as free traffic.

At 215, once the properties of the packet associated with the traffic flow are determined, the TDF 145 is intended to review a series of rules to determine which application identifier to associate this traffic flow with by taking all the properties and traffic monitoring conditions into considerations. Once a match is found that satisfies the rules, the TDF 145 associates the flows with the matching application identifier, at 220. Based on the signaling that came from the Sd interface on whether to report this application identifier to the PCRF 130 or not, the processor 165 of the TDF 145 notifies the control engine 160 to signal the PCRF 130 about the detected application and provides the traffic flow information including the source and destination and port information as specified in the 3GPP specifications. In some cases, the TDF 145 determines a multi-dimensional application identifier associated with the traffic. Although, described as after the properties of the packet are determined, it will be understood that this may occur prior to or at the same time.

At 225, the TDF 145 determines the policies or actions required based on the packet properties and the traffic monitoring conditions. At 230, the TDF 145 communicates the action to the system 100. In some cases, the traffic monitoring conditions may imply a change in charging structure and the TDF 145 may communicate with the OCS or OFCS in order to set up a new charging session or amend a current charging session. In other cases, the traffic monitoring conditions may imply that the PCRF 130 has experienced a failure and the TDF 145 may apply policies to the traffic in the absence of the PCRF 130.

Figure 2B:
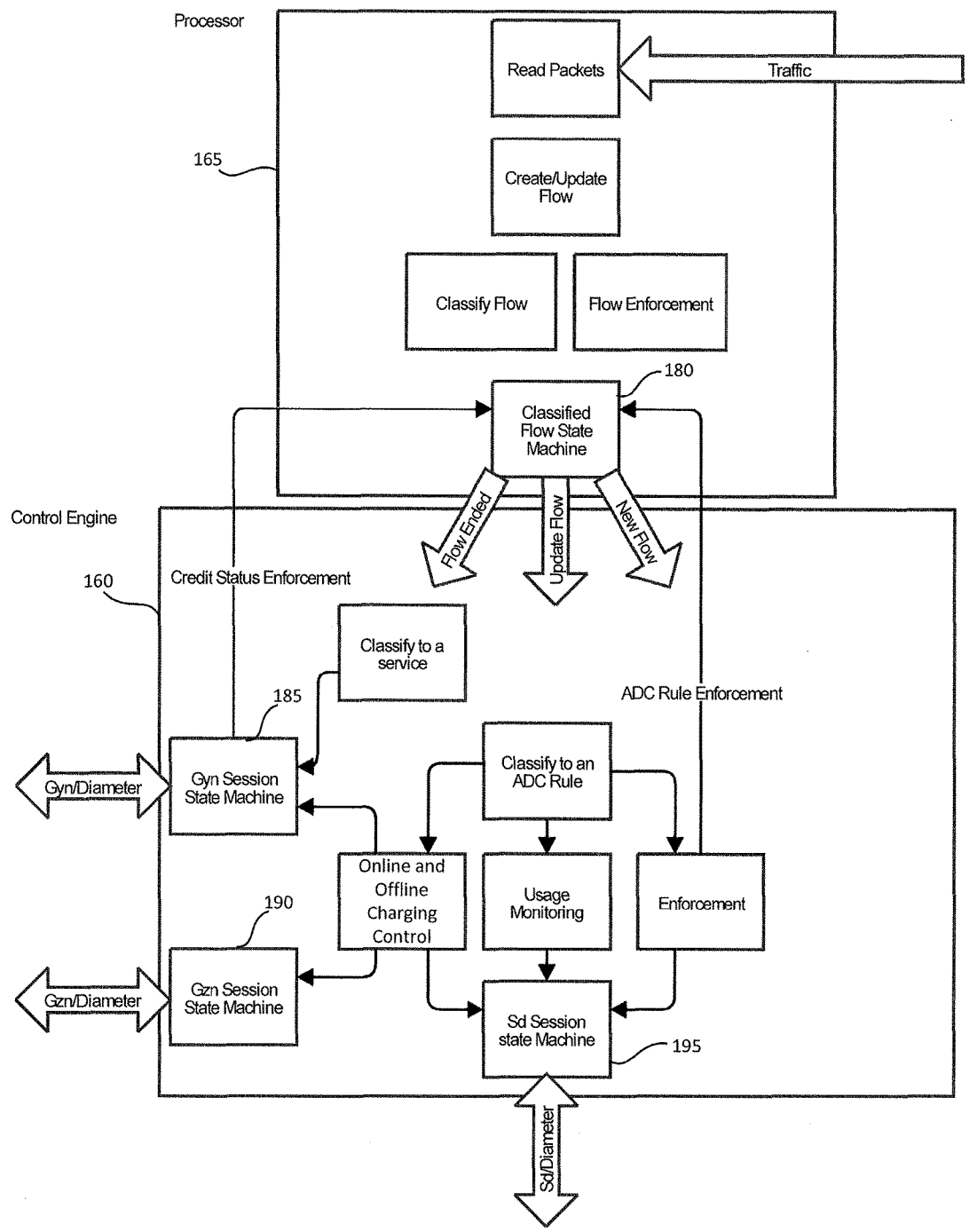

FIG. 2B illustrates an example of a traffic flow through the TDF 145 using an embodiment of the method 200 for managing traffic detection. The processor 165 reviews and reads the packets from the traffic flow and creates and updates the information related to the flow. The processor 165 further classifies the flow and determines flow enforcement for the traffic flow. The processor 165 includes a classified flow state machine 180 that provides flow information to the control engine 160 of the TDF 145. The classified flow state machine 180 provides updates related to updated flows, new flows or flows that have ended to the control engine 160.

The control engine 160 is configured to perform various actions in relation to the traffic flow and packet properties the control engine 160 receives. The control engine 160 is configured to classify the flow to a service and to classify the flow with respect to an Application Detection and Control (ADC) rule (as defined in 3GPP specifications). Once the flow is classified, the control engine 160 reviews the traffic flow with respect to online and offline charging control, usage monitoring and enforcement. On any changes to enforcement, the control engine 160 may provide for the updated ADC rule enforcement to the processor 165 or the classified flow state machine 180. The associated properties and application identifiers related to the packet and traffic flow with respect to charging control, usage monitoring and enforcement may also be reported to the Sd Session State machine 195 which may report these properties and application identifiers to the system 100 via the Sd interface and a Diameter message or via a similar process.

The charging control determined by the control engine 160 based on the properties and application identifiers of the traffic flow may be sent to a Gyn session state machine 185 or a Gzn session state machine 190. The Gyn session state machine 185 or the Gyn session state machine 190 will then communicate the determined action to the OCS or OFCS via, for example, a Diameter message.

It is intended that the embodiments of the system and method herein offer multiple benefits to the network operator beyond the benefits considered in the 3GPP specifications. Embodiments of the system and method herein offer implementation techniques that take network deployment conditions into consideration and ensure that the deployed Traffic Detection Function is carrier grade. To this end, the embodiments are intended to be fully compatible with 3GPP specifications and do not prevent network operators from taking advantage of the 3GPP TDF features.

It is intended that the system 100 provides for Policy and Charging Control (PCC) signaling optimization for the TDF 145. In particular, the system 100 is intended to reduce or eliminate the TDF dependency on the PCRF 130. Conventionally, the PCRF notifies the TDF about session events, for example, subscriber location change, quality of service change, or the like. The system 100 provides for the TDF 145 to retrieve session events from the network itself when placed in a manner were the TDF 145 is able to intercept data from, for example, the following interfaces of the network: S5/Gn, S8/Gp, S1-U/S11. In some cases, the TDF 145 may receive packets from the Radio Access Network (RAN) via the interface.

It is further intended that the system 100 provides for resilient charging and revenue assurance. In the conventional 3GPP model, the TDF loses almost all of its charging functionality when the PCRF goes down due to, for example, a network issue, an upgrade, an inherent failure in the PCRF, or the like. In the system 100 described herein, by enabling the TDF 145 to achieve subscriber awareness and in particular, subscriber awareness over interfaces such as SOAP/RESTful, Gn, S5, S8, Gn, S11, or RADIUS, the network operator can define a PCRF 130 outage policy such that the TDF 145 is capable of performing charging and revenue assurance functions while the PCRF 130 is down, the Gx interface is down, or similar network outage occurs. Conventionally the TDF would not be able to use local configuration if any of the PCRF 130, the Sd interface or the Gx interface were to be non-operational.

It is still further intended that the system 100 can provide for multi-dimensional application detection. Conventionally, a TDF can report applications to the PCRF using application identifiers. For example, if YouTube™ application traffic passes through the TDF and if instructed by the PCRF to do so, the TDF notifies the PCRF about the detection of YouTube™ application traffic using an application identifier, which may be, for example a predetermined application id such as application id=1.

Embodiments of the system 100 are intended to provide for multi-dimensional application detection, allowing the definition of an application to go beyond mere traffic characteristics and allow for application detection to derive characteristics about the subscriber's traffic, charging condition, location, or the like. For example, the TDF 145 can notify the PCRF 130, if the subscriber is generating YouTube™ application traffic and that this traffic is coming from a tethered device. The condition can be extended further to notifying the PCRF 130 about this tethered YouTube™ application traffic only if the traffic is coming from an iPad™ and in a specific location group, defined by subscriber cell locations. Location information can be obtained either from the PCRF 130 or from the signaling optimization provided by the system 100.

Multi-dimensional application definitions are intended to allow a network operator to create personalized subscriber notifications under specific conditions. For instance, the operator way wish to upsell users on higher bandwidth plans bundled with specific devices. In a specific example, the operator might wish to upsell tethering users with iPads™ to buy higher bandwidth plans that handle larger volumes of data and offer higher speeds suitable for iPads™. The operator could also upsell the users to buy a shared quota plan to reduce the need to tether devices for a small device activation fee (for example, for an extra fee, the subscriber may receive a 10 GB plan with her iPhone and iPad and the subscriber does not even need to tether). Network operators' upselling and cross-selling logic can depend on multiple factors driven by their marketing segmentation strategy. Wth multi-dimensional application reporting, the TDF 145 is intended to be configured to satisfy the marketing segmentation criteria as much as possible.

Some features of the embodiments of the method and system detailed herein are illustrated in the use cases below. In particular, various use cases are illustrated in relation to a deployment strategy of the system for managing traffic detection.

Figure 3:
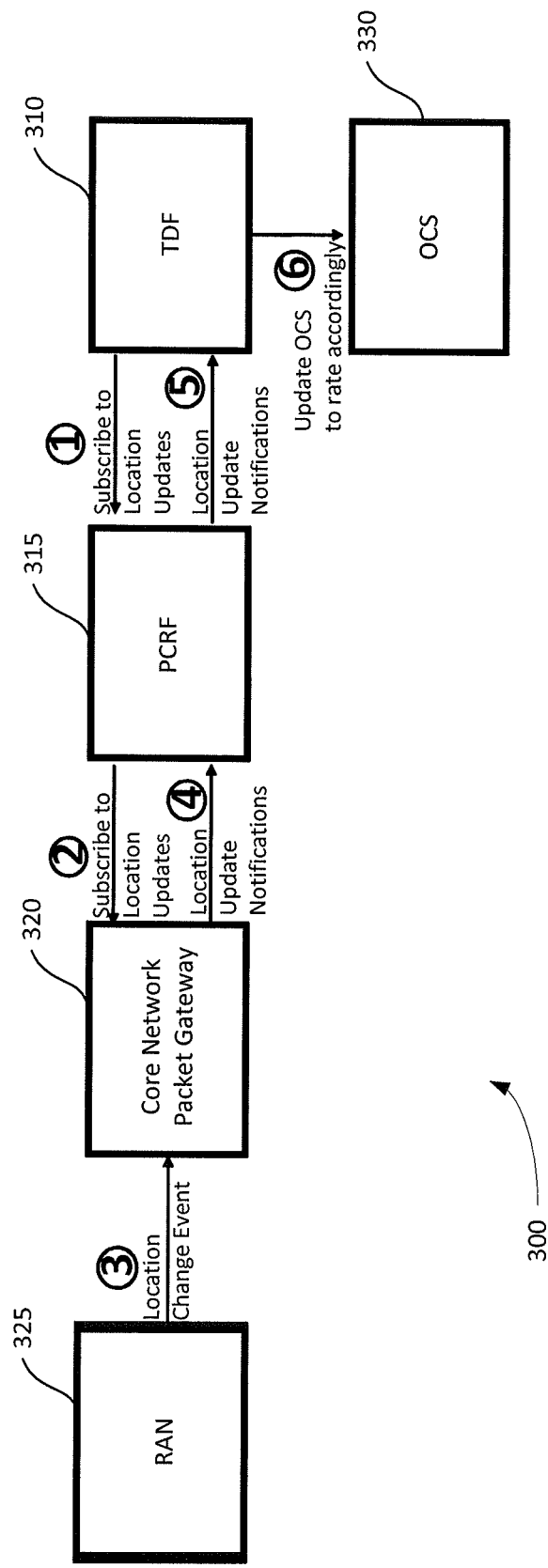
FIG. 3 is a diagram illustrating conventional data flow.

In some cases, the system 100 may be used in zone based application charging. In this case, a network operate may wish to zero rate video streaming services in the downtown at lunch time. The subscriber density and the advertising revenue may justify the investment to the network operator. To achieve this use case, the engineering team at the network operator tries to deploy the TDF solution based on the 3GPP specification by enabling the location triggers. The conventional process 300 requires the interactions in FIG. 3. First a conventional TDF 310 asks a PCRF 315 to inform the TDF 310 if any particular users or subscribers change location. In turn the PCRF 315 asks a PGW 320 to inform the PCRF 315 of any location changes. When the location change event comes from a radio network 325 the change event is received by the PGW 320. The PGW 320 informs the PCRF 315 which in turn informs the conventional TDF 310. At this stage, the conventional TDF 310 reports current usage which pertains to the last location and updates the Online Charging System (OCS) 330 about this event.

Figure 4:
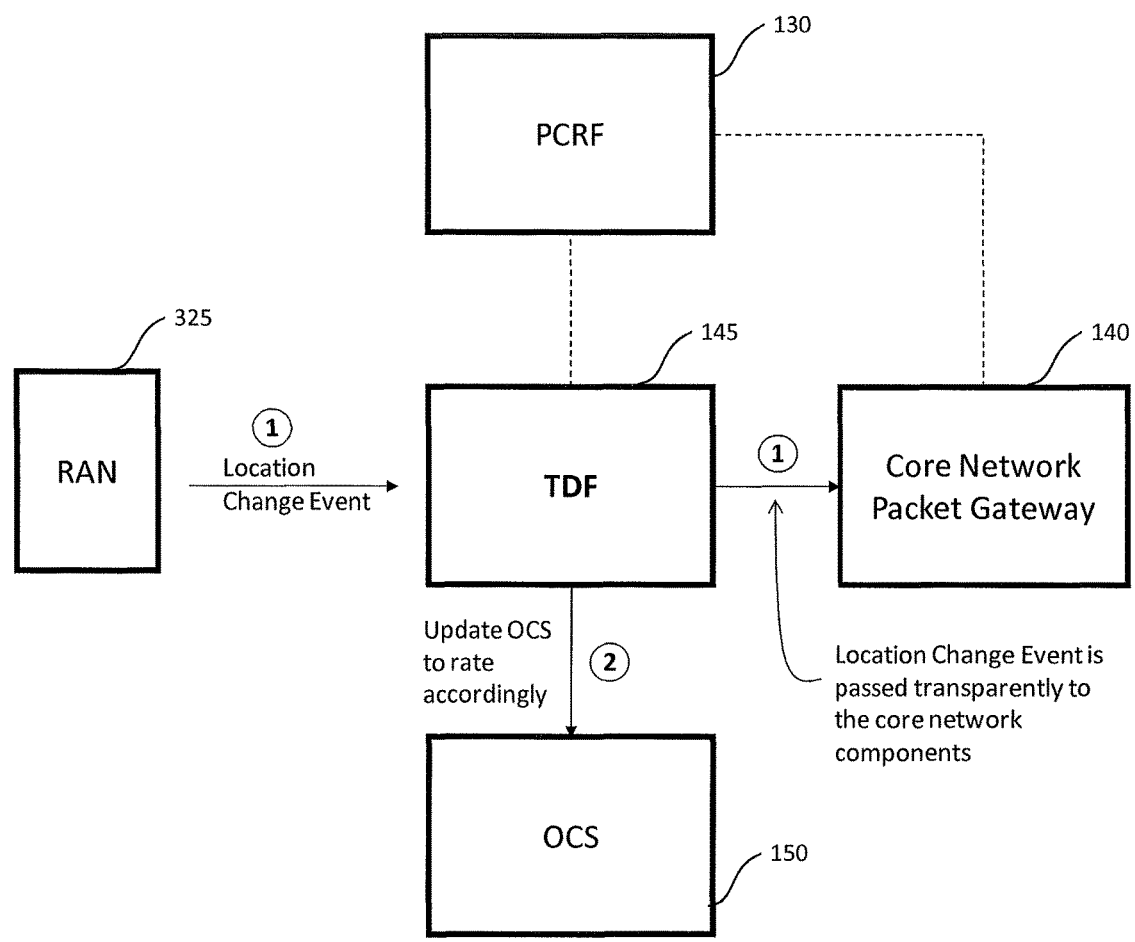
FIG. 4 is a diagram illustrating optimized data flow with the TDF.

FIG. 4 illustrates a signaling flow using the system 100 and, in particular, the TDF 145. In FIG. 4, the reduced signaling flow is illustrated where the TDF 145 is placed in the network, for example, at the Gn/S5 interface or S1-U/S11 interface where the TDF 145 gains the ability to receive and review the signaling information between the Radio Access Network (RAN) 325 and the Core Network PGW 140. In this case, the TDF 145 does not rely on informing the PCRF 130 for retrieving events from the PCRF 130 and the PGW 140. The TDF 145 is configured to passively review the traffic and determine the events as they happen in the network. As the TDF 145 is configured to determine the events, the TDF 145 is able to perform the charging updates as necessary.

Figure 5:
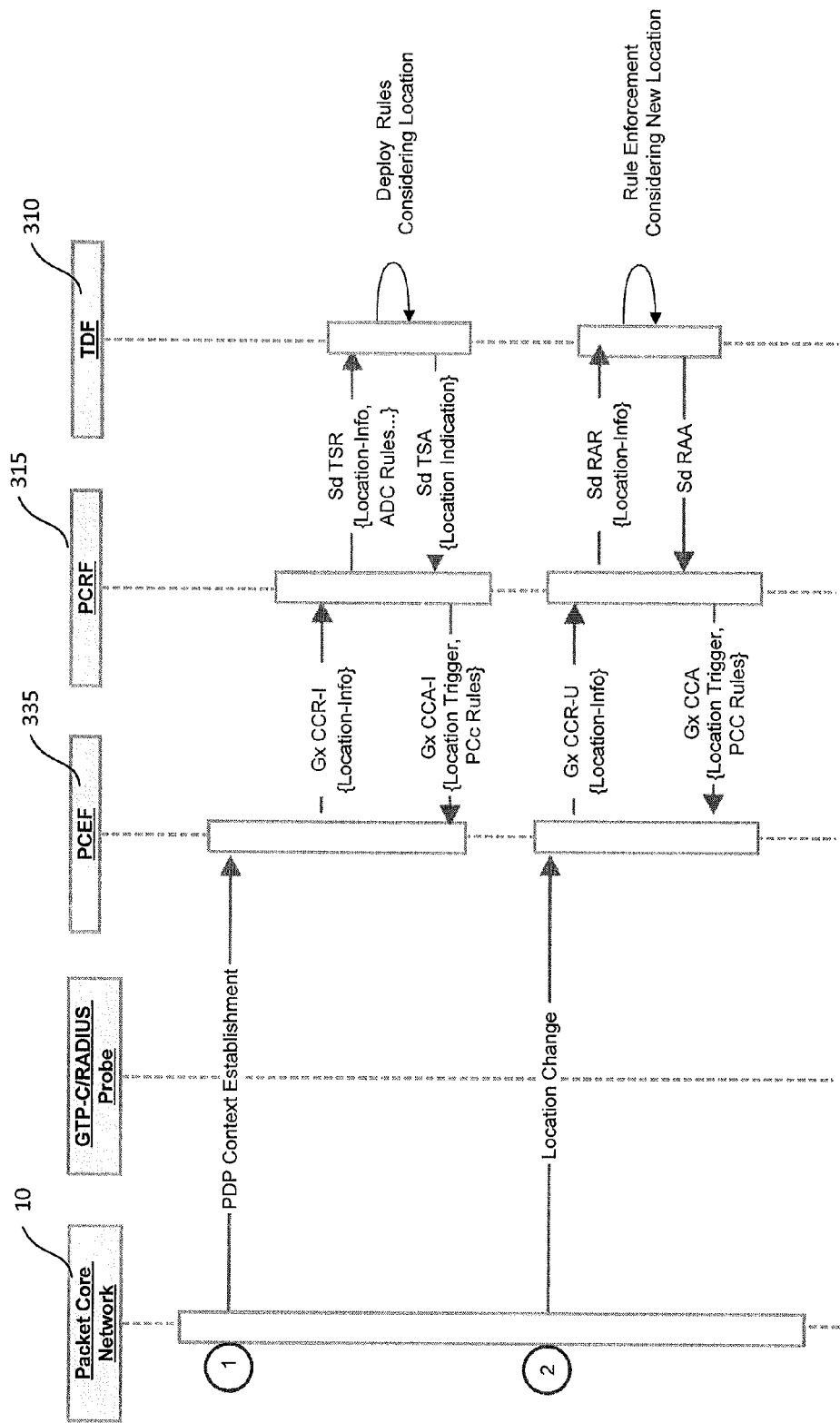
FIG. 5 illustrates conventional data flow between the core network and the TDF.
Figure 6:
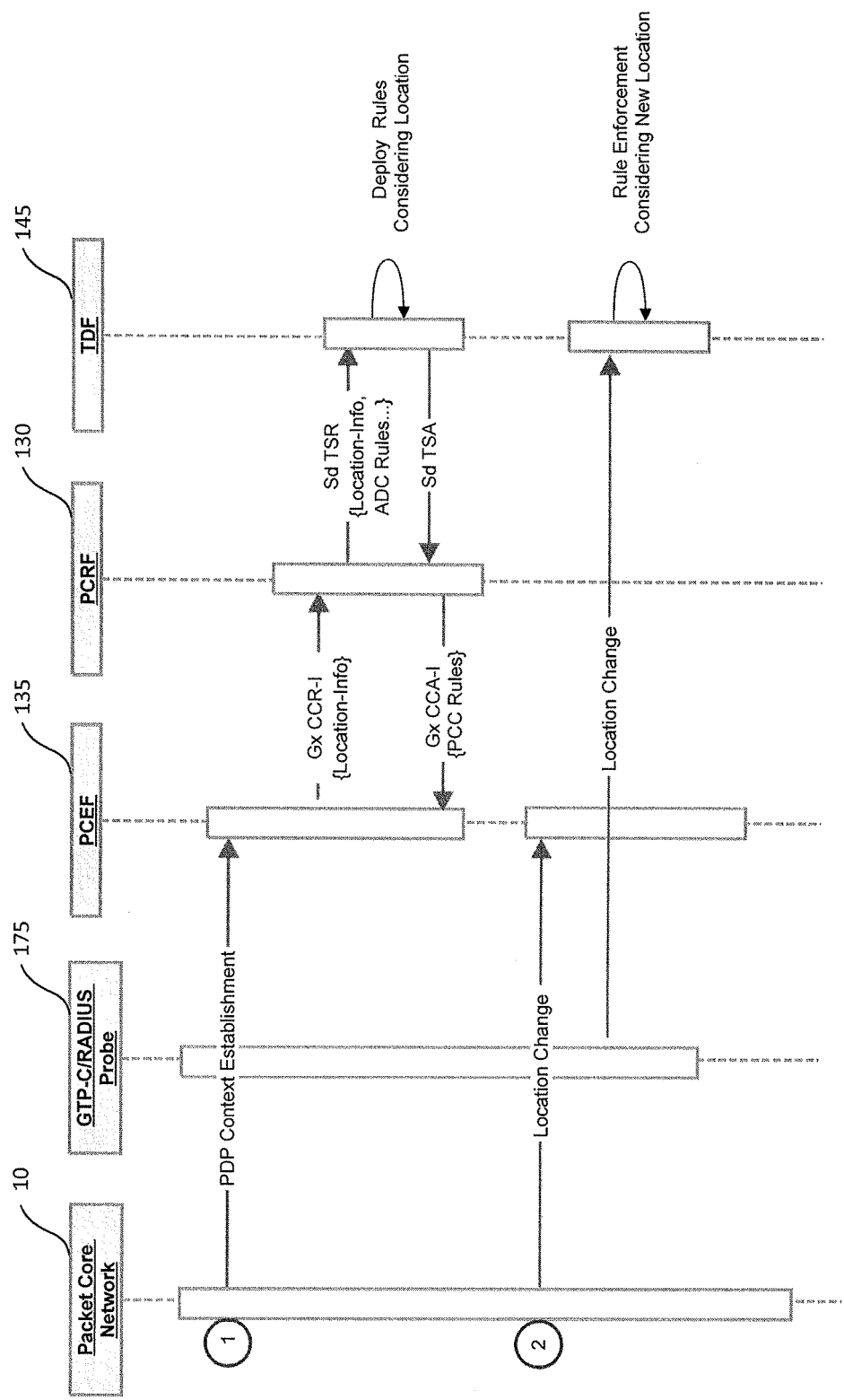
FIG. 6 illustrates optimized traffic flow between the core network and the TDF.

FIG. 5 illustrates signaling flow with a conventional traffic detection system and FIG. 6 illustrates the signal flow with an embodiment of the system 100 for traffic detection. In some cases, a TDF may want to deploy different logic based on a subscriber's location. Wth multi-dimensional application reporting and minimized dependencies on the PCRF, the system 100 is intended to allow for multi-dimensional decision making without increasing the number of Application Detection and Control (ADC) rules, location updates from the core network 10 that would be sent to the TDF 145.

A conventional traffic flow sequence is illustrated in FIG. 5. A Packet Data Protocol (PDP) context is established at the packet core network 10. Next, the PCEF 335 sends a Gx Credit-Control-Request (CCR)-I message to the PCRF 315 providing at least the initial location of the subscriber. The TDF 310 deploys the ADC rule, given the initial location of the subscriber. The TDF 310, as it wants to implement multidimensional logic based on location, replies with an Event Report Indication, registering for location updates from the PCRF 315. In order to satisfy the TDF 310 request, the PCRF 315 installs a location trigger on the PCEF 335 in the Gx Credit Control Answer (CCA)-I message, and will further install any PCC rules needed.

On a change in subscriber location, since the PCRF 315 set the location trigger, the PCEF 335 sends a Gx CCR-U message to the PCRF 315 providing the new location of the subscriber. The PCRF 315 sends a Re-Authorization Request (RAR) message to the TDF with the subscriber's new location. The TDF 310 continues to deploy the ADC rule, given the new location of the subscriber. The TDF 310 acknowledges the RAR by sending an Re-Authorize Answer (RAA) back to the PCRF 315. The PCRF 315 acknowledges the CCR-U message by sending a CCA-U back to the PCEF 335.

FIG. 6 illustrates a traffic flow sequence using the system 100. By introducing the probe 175 that is able to retrieve data from the packet core network 10 and control traffic like GTP-C and RADIUS the signaling, overhead shown in the conventional system is intended to be reduced. Note that by allowing deployment of the TDF 145 enhanced with GTP-U abilities on the S5/S8/Gn/Gp interface, the TDF 145 itself could be used as such probe, simplifying the network and minimizing signaling even further. In this case, the TDF 145 would listen to a control plane signaling within the core network, such as GTP-Cv2 or GTP-Cv1 signaling, RADIUS signaling, S1-MME signaling, or the like, to learn more aspects about the subscriber's session.

In the scenario illustrated in FIG. 6, the PDP context is established at the packet core network 10. The PCEF 135 sends a Gx CCR-I message to the PCRF 130 providing an initial location of the subscriber, as well as further traffic detail. The PCRF 130 sends a TDF Session Request (TSR) message to the TDF 145 with any ADC rules and the subscriber's initial location. The TDF 145 deploys the ADC rule, given the initial location of the subscriber. The TDF 145 acknowledges the TSR by sending a TDF Session Answer (TSA) message back to the PCRF 130. The PCRF 130 installs any PCC rules on the PCEF 135 in the Gx CCA-I message.

Once the subscriber changes its location, the probe 175 detects the location update and updates the TDF using the internal message bus between the probe 175 and the TDF 145. The TDF 145 continue deploying the ADC rule, given the new location of the subscriber. As the TDF 145 is able to receive information directly from the probe, the signaling may be reduced within the core network. Reducing the signaling may reduce not only the cost to the network operator but may also reduce the congestion as there will be less messages being transported within the core network. Further, with reducing the messaging, the system 100 may also implement a location change of a subscriber more readily and amend the charging policy once a location change has occurred.

The signaling optimization process is intended to offer several advantages. First, the signaling optimization reduces the work load on the PGW 140 by relieving the PGW 140 from having to notify the PCRF 130 of each and every location change. Being relieved from the need to perform excessive signaling handling for location updates, the PCRF 130 can leverage its processing capacity to handling more application reports from the TDF 145 and enable more valuable revenue generating use cases instead of being a message passing platform.

Furthermore, by having the TDF 145 directly listen to the location updates from the network, the delays are likely reduced by avoiding the PGW 140 to PCRF 130 to TDF 145 hops leading to more accurate charging processes (for example, if data rates were different depending on the subscriber's location). Further, due to the shorter latency and due to the visibility of all signaling in real-time, the TDF 145 can associate application traffic with a current location in real-time. For instance, if the TDF 145 was to report VoIP calls with MOS scores below 3 and in an example where a user is driving on a highway, the user might be changing locations faster than the PCRF 130 would normally be able to inform the TDF 145. When the TDF 145 gleans this information directly from the network in real-time, this will allow the TDF 145 to report the poor Vol P calls and the respective location of the call more accurately to the PCRF 130 as the TDF 145 does not have the two hop delay between the PGW and PCRF 130 and PCRF 130 and TDF 145.

In another example use case, the system 100 provides for business continuity during PCRF 130 failures and upgrades. The 3GPP standard offers the PCRF as the single source of subscriber awareness to the TDF. As stated in the 3GPP TS 29.212, the TDF session is defined as "an association between an IP-CAN session and the assigned TDF for the purpose of application detection and control by the PCRF. The association is identified by one UE IPv4 address and/or IPv6 prefix together with optionally a PDN represented by a PDN ID and a set of ADC rules to be applied by the TDF." This definition implies that the PCRF is the only source for associating the users' IP address to their identities carried over the IP-CAN connection establishment signaling.

From FIG. 1, if the Sd link is down for any reason, the application based charging process between the TDF and the OCS over the Gyn interface may not work due to the lack of subscriber information, such as, for example, a Mobile Station International Subscriber Directory Number (MSISDN), or the like, that comes from the PCRF over the Sd interface. In addition, a failure in the Gx link between the PCRF and the PGW, turns the Sd interface communication between the PCRF and the TDF ineffective. The TDF would be ineffective as the PCRF learns about the subscriber session details, specifically IP Address to subscription identity (e.g., MSISDN and/or IMSI) from the PGW over the Gx interface. Clearly, the robustness of the application based charging process is at least dependent on the health of the PCRF node, the Sd link, and the Gx link. Conventionally, the TDF's charging operation is dependent on many system components and interfaces that can fail and suffer from misconfiguration due to human error, or for other reasons. For instance failure between the PCRF and the SPR (the main database for subscriber profiles) may also be very critical. It should be noted that the failure of the PCRF might mean applying some default policies by the TDF as the TDF might not be able to derive the subscribers' plan information if there is no communication with the PCRF by listening to the network signaling.

Figure 7:
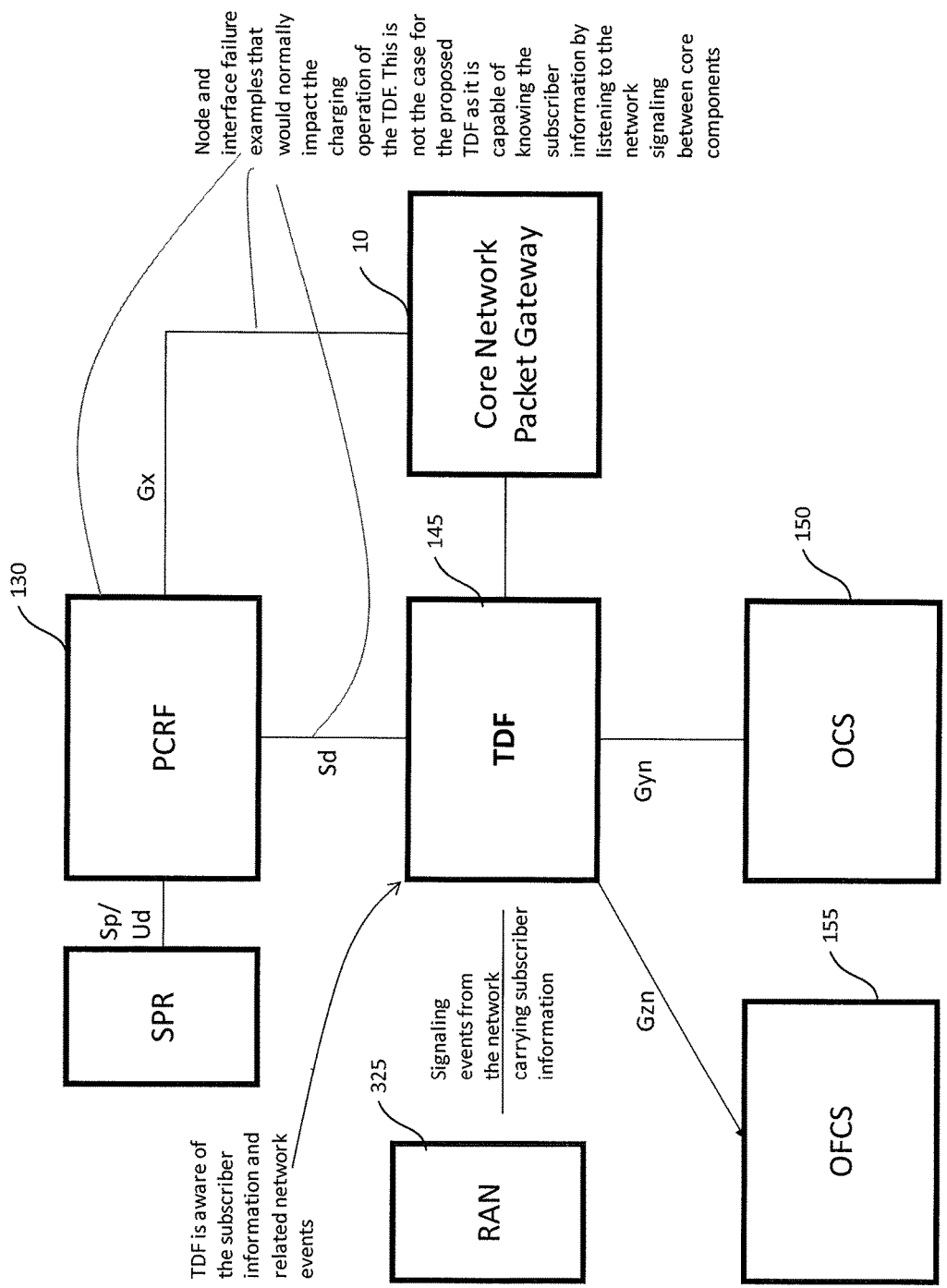
FIG. 7 illustrates interface failures that can impact the charging and revenue assurance process of the TDF.

FIG. 7 illustrates various interfaces of the TDF. The TDF 145 is intended to provide a traceable and controllable handing of the charging processes instead of a complete abrupt outage. For example, the TDF 145 might be configured to start a Gyn session when the Sd interface is down with a default policy to zero rate all possible Uniform Resource Identifiers (URIs) across all plans to avoid overcharging the subscribers. In normal conditions, the TDF 145 would know what exact applications to mark for zero rating by signaling coming from the PCRF 130. On the other hand, if the TDF 145 is incapable of leveraging network signaling to learn about the subscriber account information, it will not be able to start a Gyn session with the OCS as the OCS expects to know the subscriber's identity that is associated with the IP address. The same reasoning applies to the Gzn interface with the offline charging system (OFCS). Allowing the TDF 145 to start a Gyn session would be beneficial as the PCRF 130 might need to be upgraded, replaced or taken out of service for any administrative reason and these operations might be very difficult to otherwise achieve without disruption. Wth this use case, the impact on the TDF 145 charging processes is minimized if not eliminated in some cases in which the TDF would derive the charging profile from the network signaling for example, charging characteristics and Access Point Name (APN).

Figure 8:
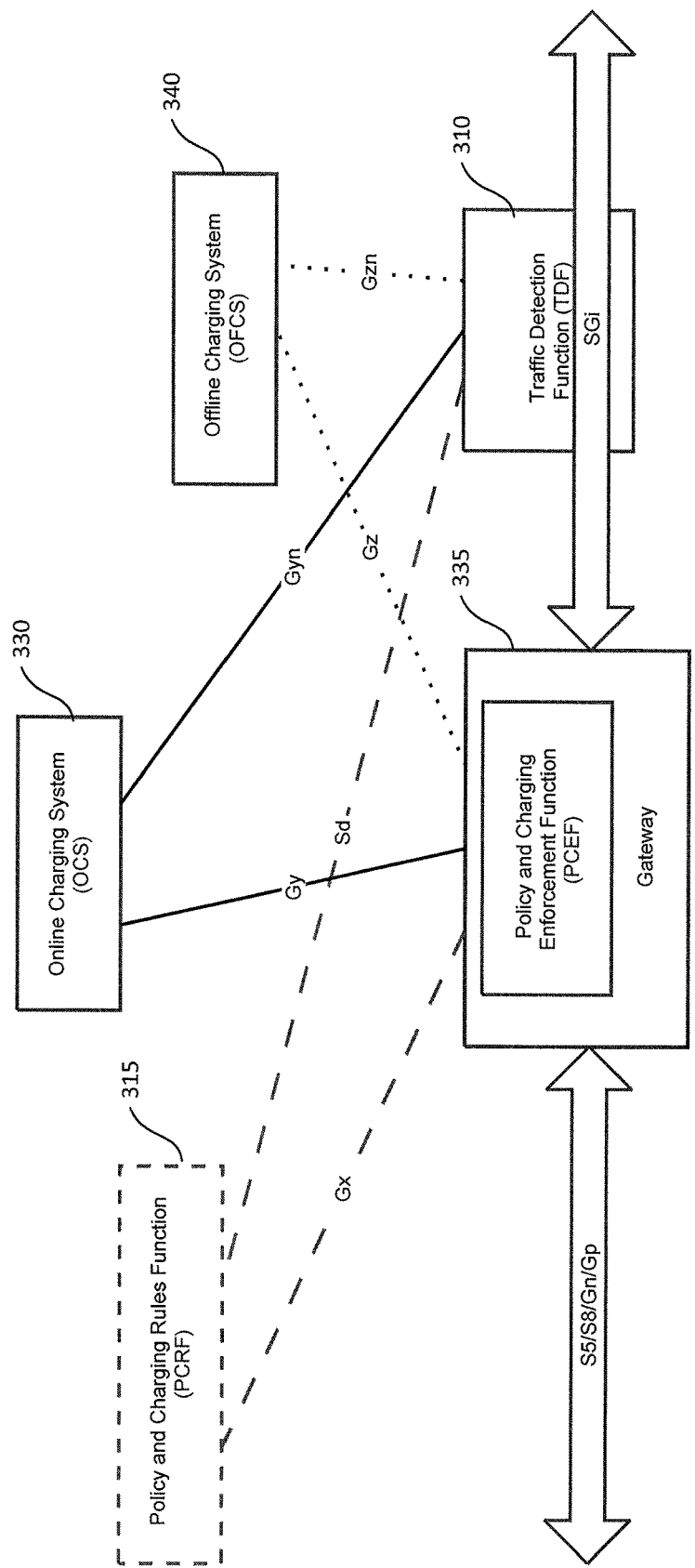
FIG. 8 illustrates a standard connectivity schema and dependencies between modules within a core network during a PCRF failure.
Figure 9:
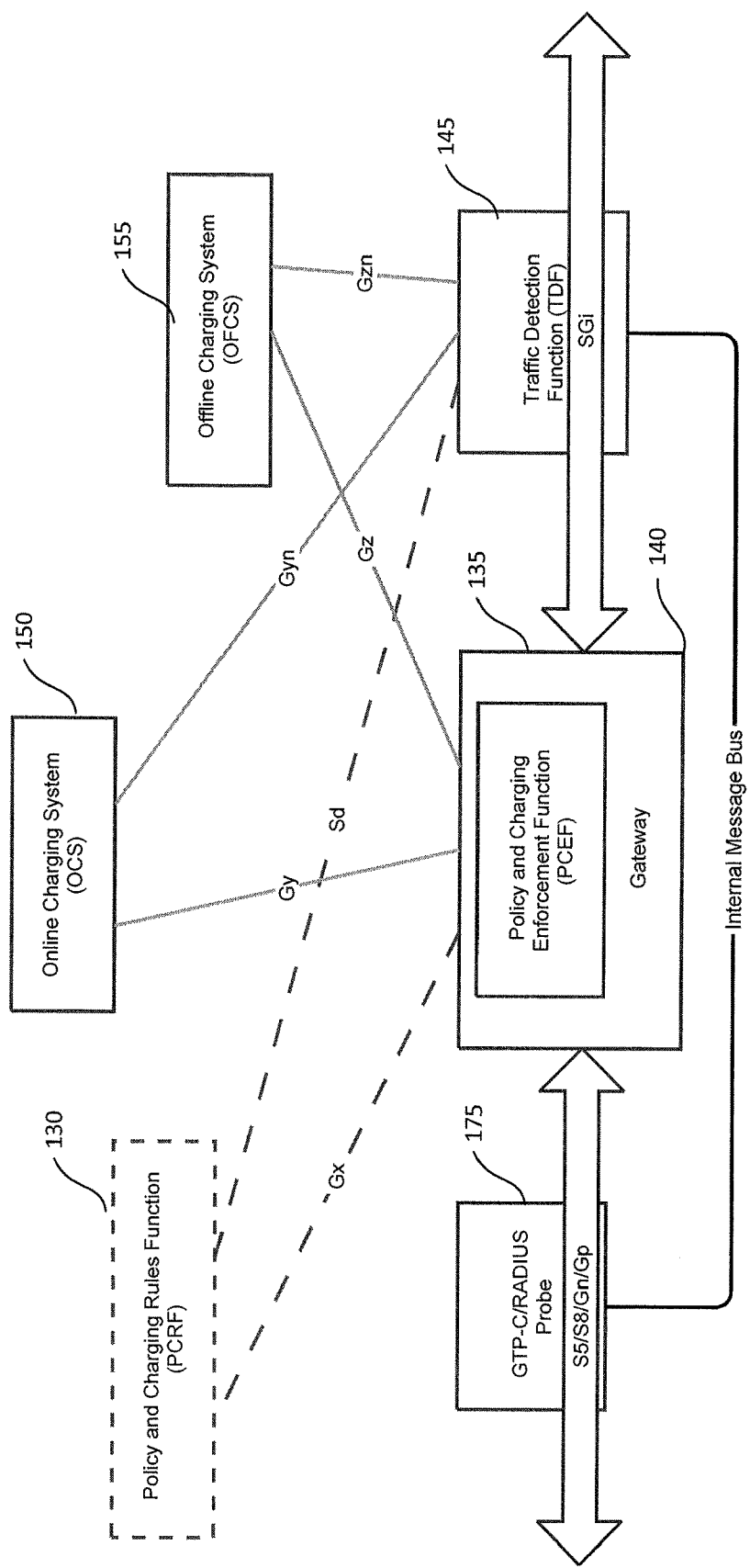
FIG. 9 illustrates an optimized connectivity schema and dependencies according to another embodiment of the system for managing traffic detection.

FIG. 8 illustrates signaling flow when the PCRF 315 goes down for application based charging. In a conventional system, as shown in FIG. 8, when there is a failure with the PCRF 315, all interfaces to the PCRF go down as well (marked as dashed lines). Some interfaces may still be up, but are becoming non-functional (marked as dotted lines) as information cannot flow on them such as those from the TDF 310 to an Offline Charging System 340. And some interfaces continue to work based on static configuration (marked as solid lines), for example from the PCEF 335 to the Online Charging System 330. In a conventional solution, the PCRF 315 will have to use static configuration for policy enforcement, online and offline charging and the TDF 310 will not be able to perform any application based charging (online or offline) since the TDF 310 requires an active Sd interface in order to be aware of subscribers FIG. 9 illustrates the signaling flow with the system 100 for managing traffic detection. In the system 100, subscriber awareness of the TDF 145 may be achieved either over the Sd interface from the PCRF 130, or, using the probe 175 on the S5/S8/Gn/Gp interfaces. As mentioned above, the probe 175 may be co-located with an enhanced TDF 145 (that can process GTP-U traffic) on the S5/S8/Gn/Gp interface; or separate, keeping the TDF 145 on the S/Gi interface, and communicate with TDF 145 of an internal message bus.

If the PCRF 130 were to experience a failure in a core network using the system 100, although some of the interfaces go down as well (marked as dashed lines). Some interfaces continue to work based on static configuration (marked as solid lines). The PCRF 130 will have to use static configuration for policy enforcement, online and offline charging. Similarly, the TDF 145 may have to use static configuration for policy enforcement, online and offline charging. However, unlike the PCEF 130, which is part of the gateway, the TDF 145 may not get any subscriber information, which is essential for the correct deployment of the static configuration for policy enforcement, as well as for Gyn and Gzn in the conventional system. With the introduction of the probe 175, the subscriber information may be sent from the GTP-C/RADIUS probe over an internal message bus to continue to allow for online and offline charging.

Figure 10:
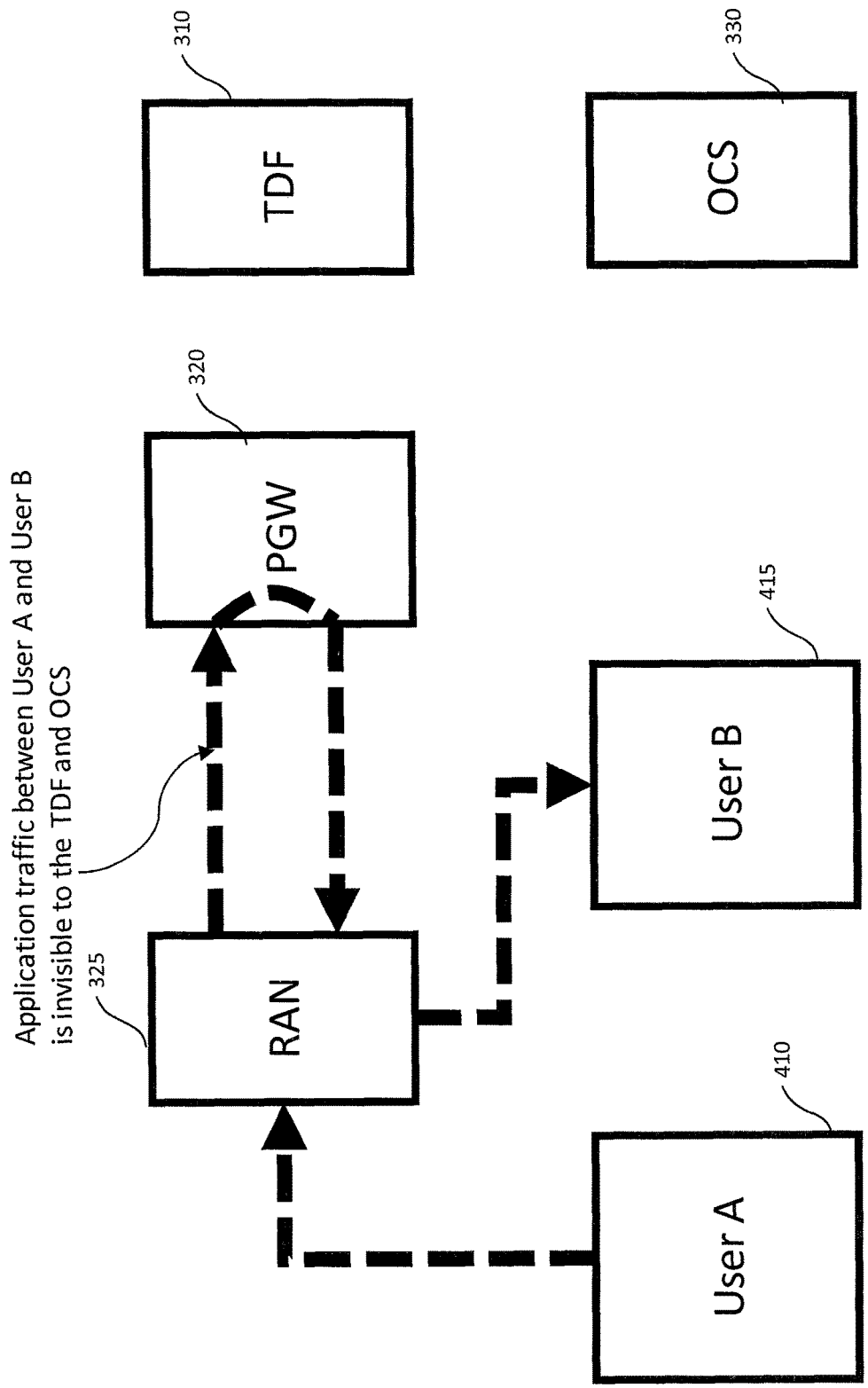
FIG. 10 illustrates application traffic between users when the PGW routes the traffic locally.

A still further use case relates to tracking and metering mobile station to mobile station signaling. In some cases the PGW 320 is configured to perform local routing of traffic between two mobile stations that it serves. If the TDF 310 is placed on the SGi link as suggested in the 3GPP specification, the TDF 310 will not be able to see this traffic and would not be able to charge appropriated for the traffic. Mobile to mobile traffic redirection is available from packet gateway vendors. This scenario is illustrated in FIG. 10. User A 410 is contacting User B 415. Application traffic between User A 410 and User B 415 travels via the RAN 325 and PGW 320 and is invisible to the TDF 310 and other components such as the OCS 330. Only the OCS 330 is shown in FIG. 10 for simplicity and it would be understood that a similar problem exists for reporting usage to the OFCS over the Gzn interface.

Figure 11:
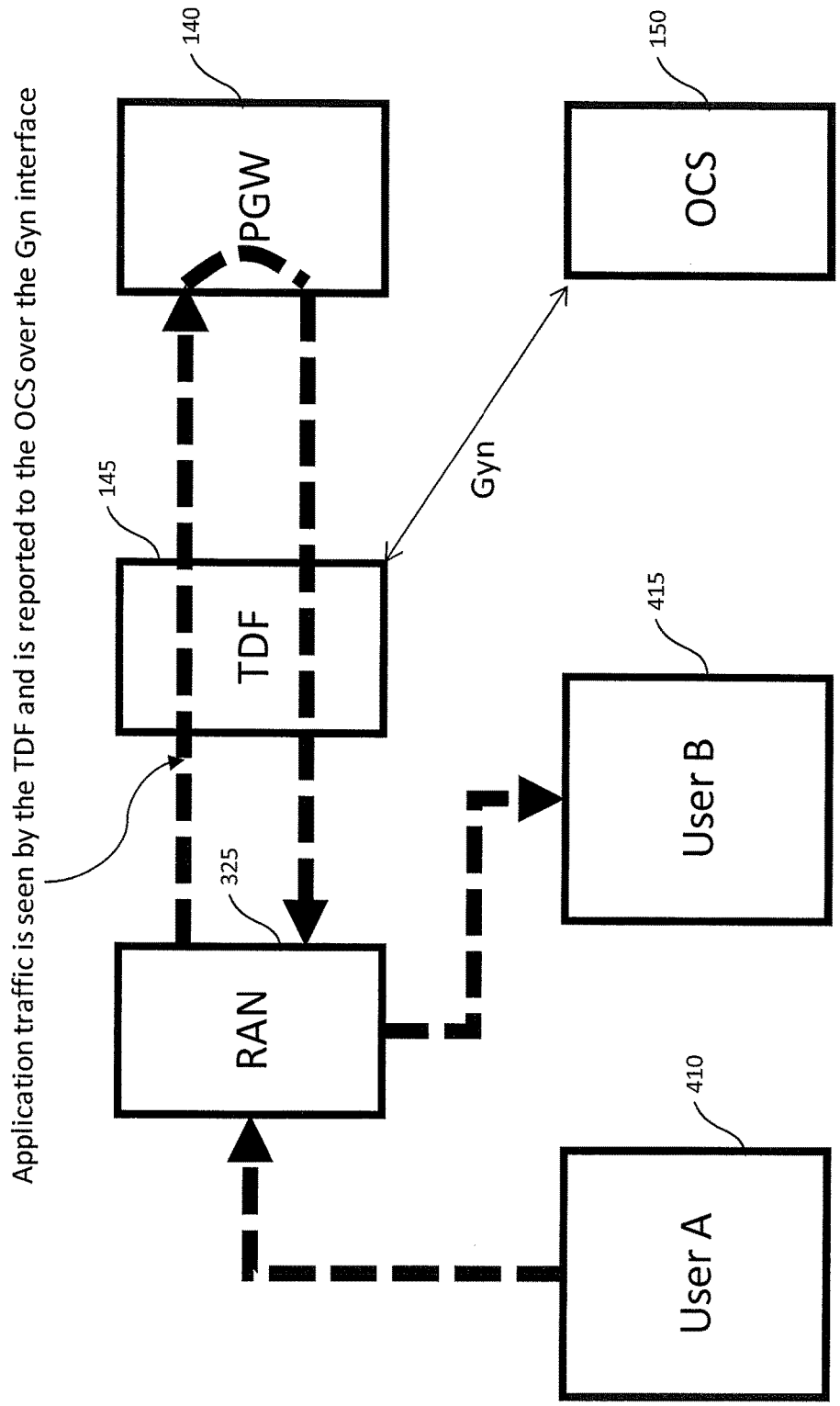
FIG. 11 illustrates application traffic between users when the PGW routes the traffic locally using the TDF.

In FIG. 11, the TDF 145 is placed to the other side of the PGW 140, for example, on the Gn/Gp links, on the S5/S8 links, or the like and is thus able to see the traffic exchanged between User A 410 and User B 415. As the TDF 145 is aware of the traffic, the TDF 145 is able to report the traffic exchange to the OCS 150 over the Gyn interface and to the OFCS over the Gzn interface. (The Gzn interface and the OFCS are not shown in FIG. 11 for simplicity). Thus, with the deployment flexibility to be placed anywhere in the network and not necessarily on the SGi link the TDF 145 is intended to enable more accurate charging of the subscribers' application data traffic and minimize revenue leakage for the network operator.

It should be noted that in FIG. 10, the revenue leakage could be significant if User A 410 was roaming on a different network. While the PCRF can be configured to instruct the PGW to never allow local routing when either User A 410 or User B 415 is roaming and which would allow roaming traffic to pass through the TDF deployed on SGi, PCRF failures can result in significant revenue leakage as the PGW will apply the default local policies of mobile station to mobile station local traffic routing leaving the TDF and the charging systems unaware of the subscriber traffic. The system 100 which includes the TDF 145 deployment as in FIG. 11 does not have this issue as locally routed traffic will always be metered by the TDF 145 irrespective of the PCRF 130 failures.

Figure 12:
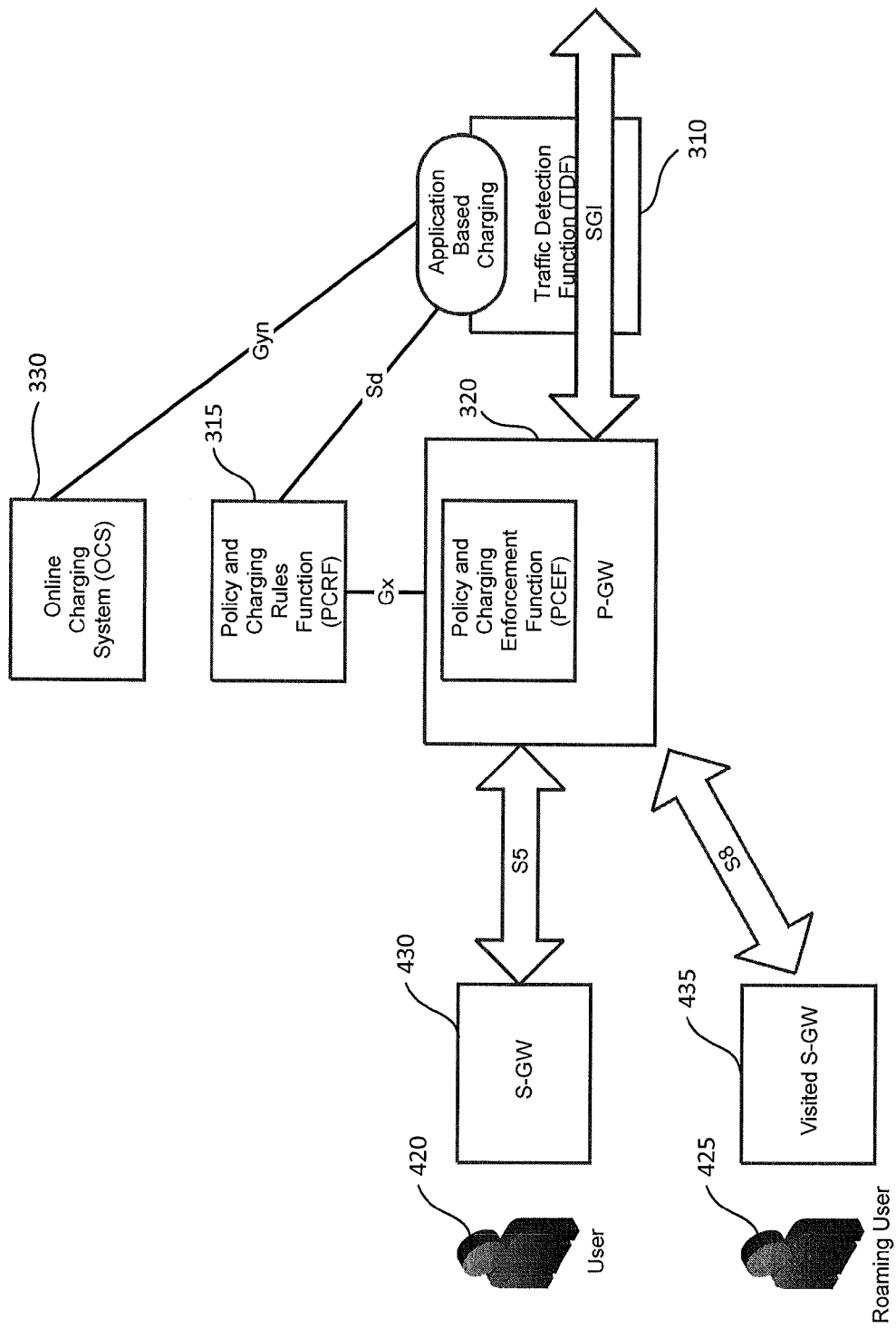
FIG. 12 illustrates a conventional approach for mobile station charging.
Figure 13:
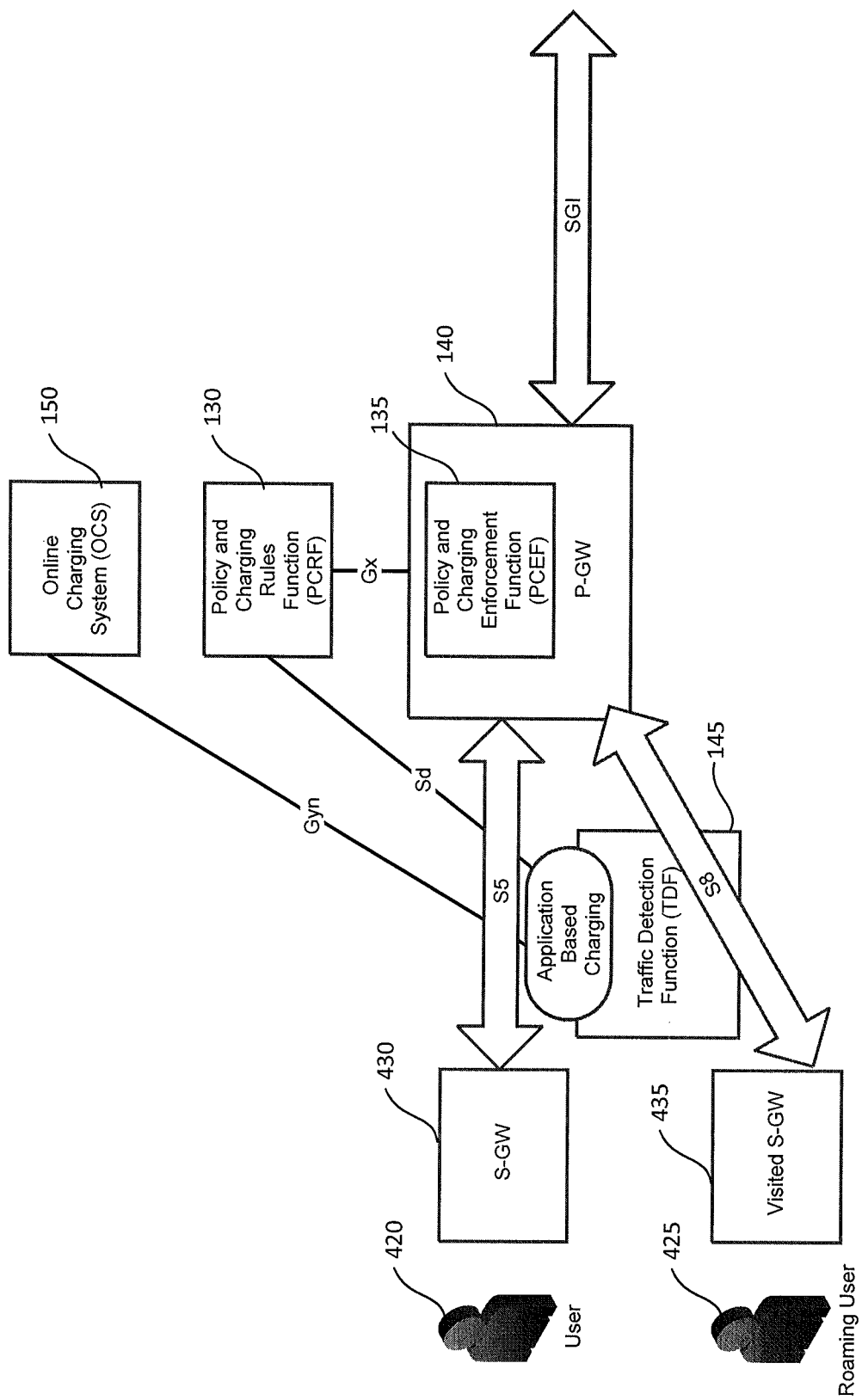
FIG. 13 illustrates mobile station charging while roaming.

FIGS. 12 and 13 illustrate signaling flow from mobile to mobile station in association with charging. FIG. 12 illustrates application based charging not performed on mobile station to mobile station traffic in a roaming case. Some gateways are optimizing routing between mobile stations (MS) served by the same gateway. If a TDF is used for application based charging (ABC), the operator may choose to exclude the MS to MS traffic from ABC for a more cost effective solution. A subscriber 420 may have access provided via a Serving Gateway (S-GW) 430 while a roaming subscriber 425 may access provided via a roaming S-GW 435. However, in a case of a roaming subscriber 425, traffic cost, as charged by the visited network may be high, and lack of ABC will create significant revenue leakage for the operator.

FIG. 13 illustrates the signal flow when the system 100 is deployed. In this example, the TDF 145 is deployed on the S5 and S8 interfaces (or Gn and Gp). Having the TDF 145 deployed on these interfaces allows for the MS to MS traffic to be charged. In some cases, the operator may decide not to charge MS to MS traffic and route it by the gateway inside the operator's network, as charging might not be cost effective in this case. However, if one of subscribers is roaming the charging would become more critical. Deploying the TDF 145 on these interfaces would allow for charging the roaming traffic. If combined with signaling optimization, the fact that the subscriber is roaming could be inferred from the network without the need to get this information from the PCRF.

Another use case relates to multi-dimensional reporting of application traffic. The TDF 145 is able to detect the application associated with the traffic and communicate the detected applications to the PCRF using an application identifier.

In 3GPP standard, the application identifier is defined as "an identifier, referring to a specific application detection filter." The application detection filter is "a logic used to detect packets generated by an application based on extended inspection of these packets, e.g., header and/or payload information, as well as dynamics of packet flows. The logic is entirely internal to a TDF or a PCEF enhanced with ADC, and is out of scope of this specification." Embodiments of the method and system propose a broader definition of an application filter to allow the TDF 145 to capture more information than required by the 3GPP specification.

Embodiments of the system and method disclosed herein may provide for a systematic method of defining applications. In some cases, there may be various levels of application definitions (sometimes referred to as application detection filters).

One level of application definitions may include network operator defined applications. The detected application can be based on a specific classification criteria created by the operator, for example, application id=1 could be YouTube™ application traffic, application id=2 could be be operator-portal.com, application id=3 could be be zero rated URLs, etc.

A second level of application definitions may include protocols in the TDF protocol identification library. Each protocol in the protocol identification library at the TDF has a specific application identifier along with its traffic signature, which is derived from protocol identification techniques used by the TDF. The reported application identifier is matched to the identifier defined in the protocol library.

A third level of applications may include multi-dimensional application reporting. Application definitions may include detail related to an application beyond mere traffic characteristics. Allowing the further detail is intended to provide the ability to the TDF 145 to derive characteristics about the subscriber's traffic, charging condition, location, or the like. For example, the TDF 145 can notify the PCRF 130 if the subscriber is generating YouTube™ traffic and whether the traffic is coming from a tethered device. The condition can be extended further to notifying the PCRF 130 about the tethered YouTube™ traffic only if the traffic is coming from an iPad™ and in a specific location group, which may be defined by subscriber cell locations. Location information can be obtained either from the PCRF 130 or may take advantage of the signaling optimization described herein.

In some cases, various levels of application definitions may be combined. In this case, the TDF 145 can be configured with operator defined application identifiers for simple applications such as ones belonging to their walled garden offerings (for example, operators music service, operator's exclusive offers portal, etc). Since these applications are operator specific they may be defined explicitly. In addition to the operator's portals, the TDF 145 can be configured to report any traffic that matches a layer 7 signature in its protocol library such as Netflix™, Hulu™, Spotify™, etc. Furthermore, the operator might have specific marketing offers for users located in the downtown areas, that tether streaming video content over their tablets. This can be achieved with a multi-dimensional application identifier. As can be seen from this example, the TDF 145 can be configured to simultaneously handle a range of application reporting requirements from the operator ranging from simple operator defined rules, to pre-configured signatures in the TDF's protocol library, to a multi-dimensional application definition to satisfy various given marketing criteria.

Examples are detailed herein with respect to some of the advantages that are intended to be realized with the application definitions. In some cases, the application definitions can be combined to report a specific application identifier to the PCRF to trigger further decision logic.

In some cases, the quality of data stream may be measured. In this example, the PCRF 130 may wish to determine whether the user accesses low quality video on a separate application identifier from that used if the user accesses high quality video. The video quality is a dimension that is added to the video, providing for multi-dimensional application reporting. In some cases, such as encrypted video, sophisticated machine learning methods might be applied to determine whether a video flow is low quality or high quality. This example can be extended to other applications such as Voice over IP (Vol P). The reporting might be designed to report VoIP calls that have a score poorer than 3 out of 5 as a separate dimension in multi-dimensional application reporting. Based on this knowledge the PCRF 130 might signal the PGW and thus the RAN to increase the priority of the VoIP traffic stream or zero rate poor quality voice.

A further example is detailed with respect to determining whether a device is tethered. Consider a scenario in which the network operator wants the PCRF 130 to be notified about low quality VoIP connections only if the VoIP traffic is being tethered. With this information, the network operator is intending to attempt to sell subscribers on a more complete plan that is better suited for tethering, for example, a plan with a higher quota. In this case, the system and method described herein address this issue by defining an application identifier for low quality VoIP traffic that is coming from a tethering device separate from the application identifier that identifies low quality VoIP traffic not from a tethered device. In this example the application identifier refers to three dimensional criteria: a. the VoIP traffic b. its quality, for example the Mean Opinion Score (MOS) and c. whether the VoIP traffic is coming from a tethered device In a still further example, the system and method provide for access technology and network conditions. The network operator might be interested in notifying the PCRF 130 if the subscriber initiates VoIP traffic over a certain radio access technology or coming from a specific location, for example a specific case of notifying the PCRF 130 if VoIP traffic is initiated in the downtown region. An application identifier is created for the purpose of tracking this category. Conventionally, it may be possible for the PCRF to combine the location information and radio access technology from the network, for example, the Gx interface with the PGW with the application information coming from the TDF, but this would not be possible if the operator disables updates between the PGW and the PCRF over the Gx interface, or for other similar reasons. In the system 100, which includes signaling optimization, the TDF 145 is configured to passively listen or retrieve this information from a packet within the traffic flow and provide the information to the PCRF 130 at reduced signaling and reduced computation logic on the PCRF side. It will be understood that reduced signaling and reduced computation logic is intended to provide a benefit to the network operator. In particular, it is intended to reduce the cost to the network operator and reduce the added congestion to the network operator's core network.

In yet another example the multi-dimensional application reporting may be beneficial for security conditions. If the network operator has determined that the PCRF 130 should know if the subscriber is subject to a security attack or is suspected of a worm infection. In this case, an application identifier can be assigned to cover the scenario by notifying the PCRF 130 about the security condition suffered by the subscriber. The PCRF can use this information to block the subscriber or shape the subscriber's bandwidth as well as sending the subscriber a notification advising him about the infection. The activation of security condition monitoring can be performed using PCRF ADC rules signaled over the Sd interface or using static TDF policies. In some cases, the network operator may also wish to contact the subscriber in order to suggest other network plans that offer clean connectivity in which the network operator might offer additional security as a value added service.

The system and method detailed herein may also be beneficial in determining fraud scenarios. The PCRF 130 may wish to determine whether a subscriber is trying to generate fraudulent traffic in the network to bypass some zero rating criteria. For example, malicious subscribers might perform DNS tunneling of traffic that would be otherwise chargeable by the network operator and present the traffic to the network as DNS which is zero rated by the network operator. In this case, the TDF 145 detects this condition via DNS analysis or more sophisticated machine learning and reports this scenario as an application identifier to the PCRF 130. The network operator can configure a specific application identifier, for example application id=10000, to mean that the TDF 145 has detected fraudulent DNS traffic. As previously noted, the application id may be any predefined number.

In some cases, the various example may be combined to provide application detection information to the PCRF through a single application identifier or through a combination of multiple identifiers related to a particular subscriber's traffic flow.

Accurate traffic identification and insightful measurements form the foundation of network business intelligence and network policy control. Without identifying and measuring the traffic flowing on their networks, Communication Service Providers (CSPs) are unable to craft new subscriber services, optimize shared resource utilization, or ensure correct billing and charging.

With the system and methods disclosed herein, the concept of traffic classification beyond identification is described. In particular, determining what the traffic is based on 5 tuples or basic traffic related signatures. Multi-dimensional classification of traffic allows for rich handling of traffic without a significant increase to the number of ADC rules. For example HTTP traffic could be classified based on the domain as well as the device types that may also be deduced from the traffic, by for example, using HTTP meta-data, or the like.

Figure 14:
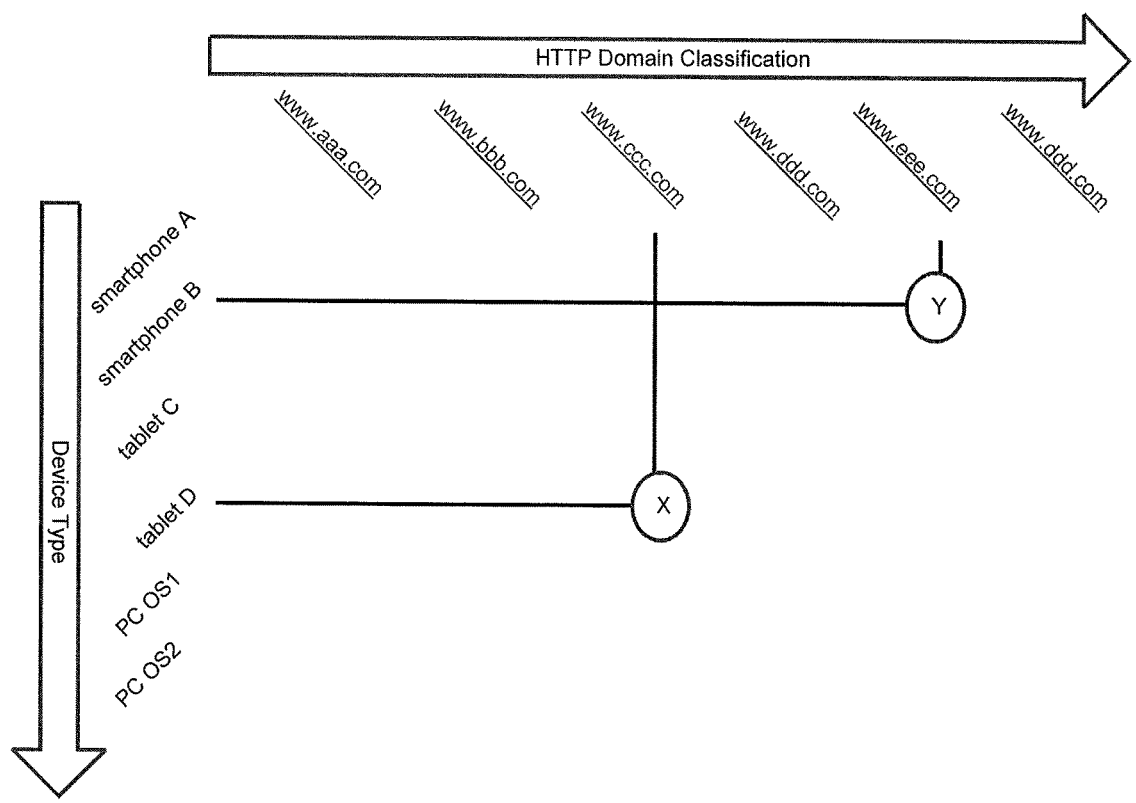
FIG. 14 illustrates a 2-dimensional classification of web domains according to device types.

FIG. 14 illustrates a two dimensional classification of web domains according to device type. In this figure, traffic classified as application "X" indicate user that browse the www.ccc.com domain using a tablet of type D. Traffic classified as application "Y" indicate user that browse the www.eee.com domain using a smartphone of type B.

Figure 15:
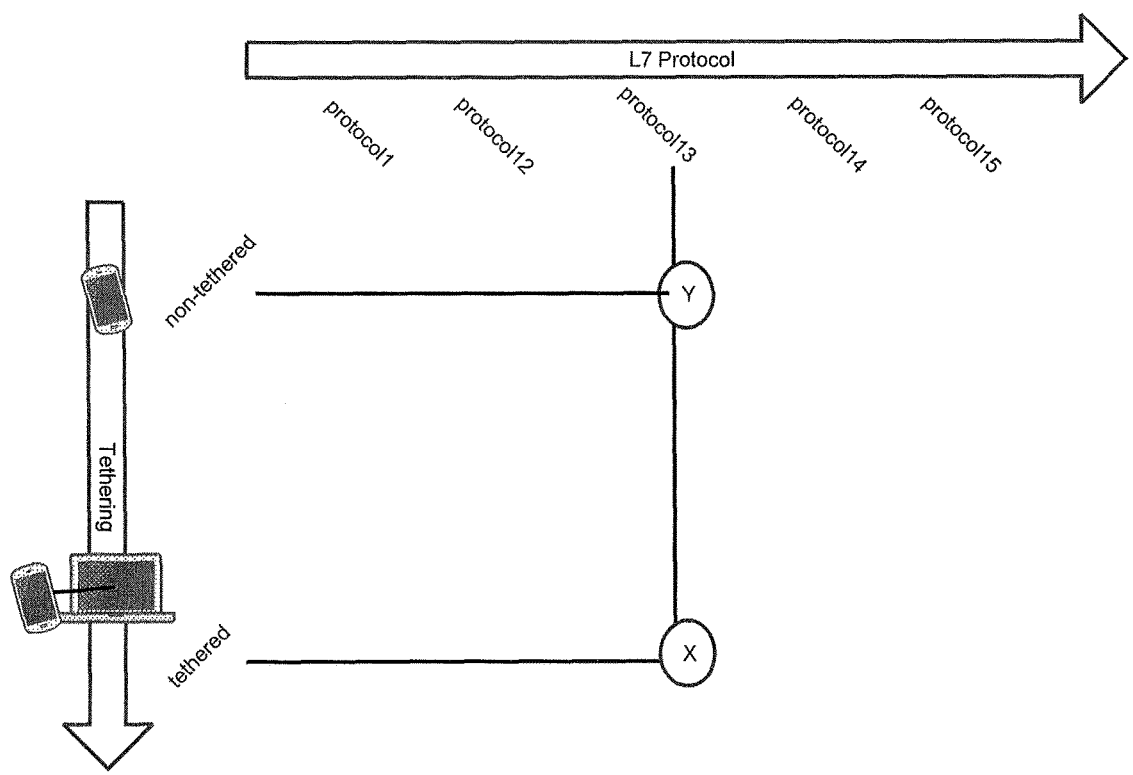
FIG. 15 illustrates a 2-dimensional classification of L7 protocols according to tethering indication.

FIG. 15 illustrates two dimensional classification of L7 protocols (of the Open Systems Interconnection model layers, wherein L7 is the Application Layer) according to tethering indication. In the following example the tethering information together with L7 protocol classification provides for greater detail with respect to the application and the subscriber device accessing the application.

In that example, traffic classified as application "X" indicate user that uses protocol3 on a regular device. While traffic classified as application "Y" indicate user that uses protocol3 on a tethered device.

Similarly, the vertical dimension or an additional dimension could track, for example: Radio Access Technology (RAT) type, location, Public Land Module Network (PLMN) or the like. Note that in all of these cases, extensive signaling may be required from the core network to the TDF in a conventional system. It is intended that the system 100 disclosed herein would use reduced signaling as described.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for managing traffic detection on a network comprising:
   receiving, at a traffic detection function (TDF), predetermined traffic monitoring conditions;
   retrieving and processing, at a processor associated with the TDF, at least one packet from a traffic flow of a subscriber to determine packet properties and a subscriber location associated with the at least one packet from the traffic flow, wherein the TDF retrieves the at least one packet between a Radio Access Network and a Core Network;
   determining, at a control engine associated with the TDF, an application identifier to associate with the traffic flow based on the packet properties;
   determining, at the control engine, at least one policy to apply to the traffic flow based on the traffic monitoring conditions, packet properties, subscriber location, and the application identifier; and
   communicating the at least one policy to be applied to the traffic flow.

2. A method according to claim 1, wherein the application identifier is a multi-dimensional application identifier, wherein the multi-dimensional application identifier comprises a definition of an application and characteristics of the subscriber's traffic flow.

3. A method according to claim 2, wherein the characteristics of the subscriber's traffic flow of the multi-dimensional application identifier indicates whether the traffic flow is associated with a tethered device.

4. A method according to claim 2, further comprising determining at least one multi-dimensional policy to be applied to the traffic based at least in part on the multi-dimensional application identifier.

5. A method according to claim 2, wherein the characteristics of the subscriber's traffic comprise: charging condition, subscriber's device; subscriber cell location.

6. A method according to claim 5, further comprising determining at least one personalized subscriber notification based at least in part on the multi-dimensional application identifier.

7. A method according to claim 1, wherein communicating the at least one policy comprises communicating a request to create a new charging session for the traffic flow.

8. A method according to claim 1, wherein, if the processor determines a change in subscriber location, the method further comprises creating a new charging session for the subscriber.

9. A method according to claim 1, further comprising reporting the application identifier to a network operator.

10. A method according to claim 1, further comprising determining at least one policy based on the subscriber location.

11. A method according to claim 1, wherein retrieving the at least one packet between a Radio Access Network and a Core Network reduces the signaling flow within the Core Network.

12. A system for managing traffic detection on a network comprising:

a traffic detection function (TDF) configured to receive predetermined traffic monitoring conditions, wherein the TDF comprises:
  a processor configured to retrieve and process at least one packet from a traffic flow of a subscriber to determine packet properties and a subscriber location associated with the at least one packet from the traffic flow, wherein the TDF retrieves the at least one packet between a Radio Access Network and a Core Network; and
  a control engine configured to:
    determine an application identifier to associated with the traffic flow based on the packet properties;
    determine at least one policy to apply to the traffic flow based on the traffic monitoring conditions, the packet properties, the subscriber location, and application identifier; and
    communicate the at least one policy to apply to the traffic flow.

13. A system according to claim 12, wherein the application identifier is a multi-dimensional application identifier, wherein the multi-dimensional application identifier comprises a definition of an application and characteristics of the subscriber's traffic flow.

14. A system according to claim 13, wherein the characteristics of the subscriber's traffic flow of the multi-dimensional application identifier indicates whether the traffic flow is associated with a tethered device.

15. A system according to claim 12, wherein the control engine is further configured to communicate a request to create a new charging session for the traffic flow.

16. A system according to claim 12, wherein, if the processor determines a change in the subscriber location, the control engine is configured to communicate at least one policy to create a new charging session for the subscriber.

17. A system according to claim 12, wherein the control engine is configured to report the application identifier to a network operator.

18. A system according to claim 12, wherein the control engine is configured to associate the subscriber location with the packet and determine at least one policy based on the subscriber location.

* * * * *